(12) United States Patent
Deng et al.

(10) Patent No.: US 8,643,567 B2
(45) Date of Patent: Feb. 4, 2014

(54) MULTI-LAYER DISPLAY

(75) Inventors: Ye Deng, Meylan (FR); Victor Ciriza, La Tour du Pin (FR)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 12/473,369

(22) Filed: May 28, 2009

(65) Prior Publication Data
US 2010/0302173 A1 Dec. 2, 2010

(51) Int. Cl.
*G09G 5/00* (2006.01)
(52) U.S. Cl.
USPC .......................................................... 345/1.3
(58) Field of Classification Search
USPC .................................................. 345/1.1–3.1
See application file for complete search history.

(56) References Cited

U.S. PATENT DOCUMENTS

| | | | |
|---|---|---|---|
| 6,744,527 B1 | 6/2004 | Dorsey et al. | |
| 7,018,043 B2* | 3/2006 | Castaldi et al. | 353/30 |
| 7,724,208 B1* | 5/2010 | Engel et al. | 345/4 |
| 2005/0052835 A1* | 3/2005 | Wu et al. | 361/681 |
| 2006/0034042 A1* | 2/2006 | Hisano et al. | 361/681 |
| 2006/0197716 A1* | 9/2006 | Tanaka et al. | 345/6 |
| 2006/0197973 A1 | 9/2006 | Castellani et al. | |
| 2007/0115202 A1* | 5/2007 | Kiesenhofer | 345/1.1 |
| 2007/0192085 A1 | 8/2007 | Roulland et al. | |
| 2008/0062625 A1* | 3/2008 | Batio | 361/680 |
| 2008/0091408 A1 | 4/2008 | Roulland et al. | |
| 2008/0294423 A1 | 11/2008 | Castellani et al. | |
| 2009/0070709 A1 | 3/2009 | Engel | |
| 2009/0298546 A1* | 12/2009 | Kim et al. | 455/566 |

FOREIGN PATENT DOCUMENTS

WO WO 2009/023862 A1 2/2009

OTHER PUBLICATIONS http://en.wikipedia.org/wiki/Head-up_display, last modified Apr. 21, 2009, downloaded Apr. 22, 2009.
Puredepth, *White Paper Multi-Layer Displays [MLDs]*, R&D Team, PDNZ, released Dec. 2, 2007, available at http://www.puredepth.com.
U.S. Appl. No. 11/875,183, filed Oct. 19, 2007, Roulland, et al.
U.S. Appl. No. 12/126,115, filed May 23, 2008, Castellani, et al.
U.S. Appl. No. 12/396,506, filed Mar. 3, 2009, Roulland, et al.

* cited by examiner

*Primary Examiner* — Jonathan Boyd
(74) *Attorney, Agent, or Firm* — Fay Sharpe LLP

(57) ABSTRACT

A display system suitable for controlling operations of a multifunction device, such as a printer, and a method which makes use of the display system are disclosed. The display system includes a front panel configured for selectively displaying a local user interface and being touch sensitive for controlling an associated device based on touch selectable graphic objects displayed on the local user interface. A rear panel is configured for selectively displaying the local user interface, which is viewable through the front panel. A switching component is configured for switching the display of the local user interface between the front panel and the rear panel.

26 Claims, 7 Drawing Sheets

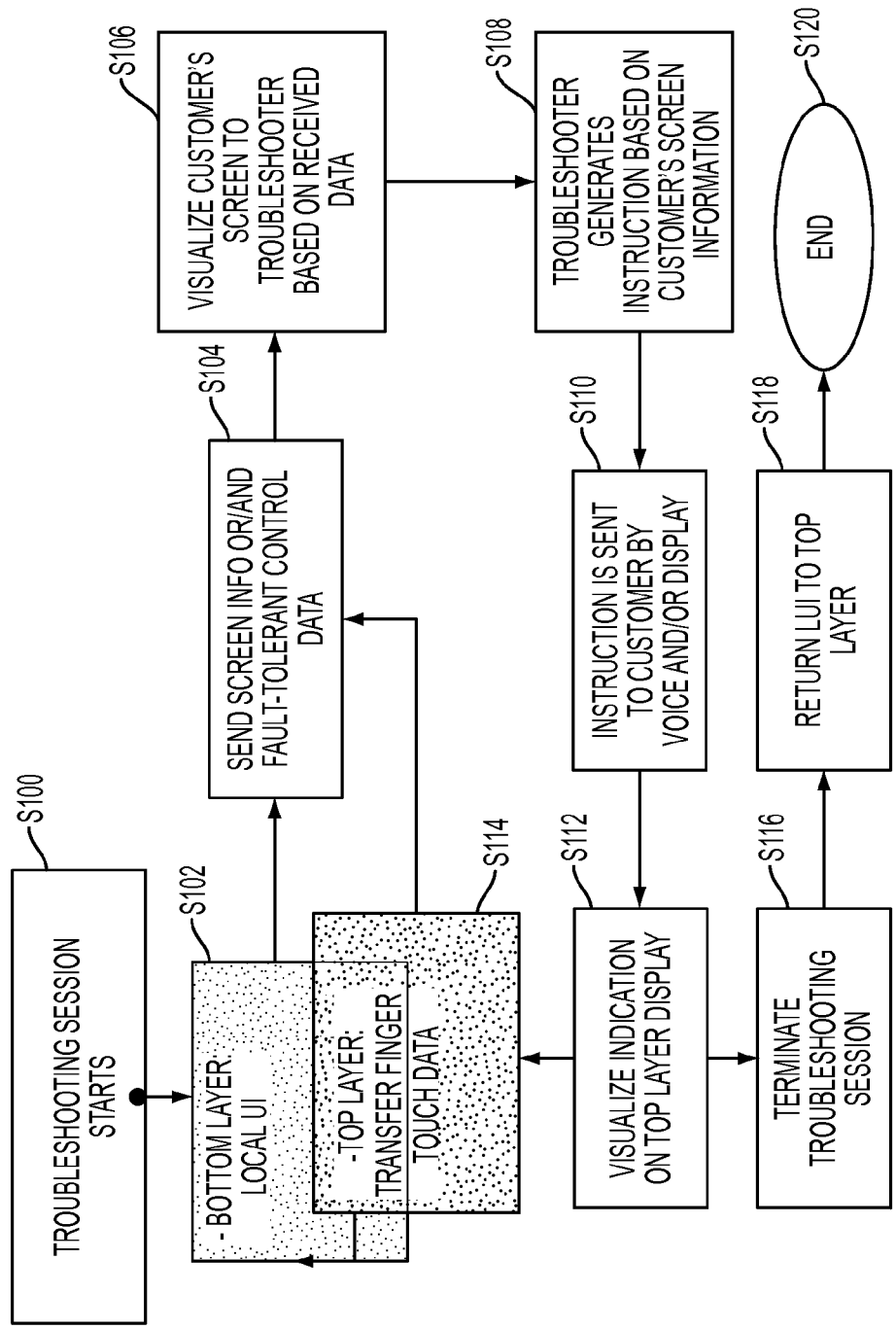

MULTI-LAYER DISPLAY

CROSS REFERENCE TO RELATED PATENTS AND APPLICATIONS

The following references, the disclosures of which are incorporated herein in their entireties by reference, are mentioned:

U.S. application Ser. No. 12/396,506, filed Mar. 3, 2009, entitled COLLABORATIVE LINKING OF SUPPORT KNOWLEDGE BASES WITH VISUALIZATION OF DEVICE, by Frederic Roulland, et al.;

Application Ser. No. 12/126,115, filed May 23, 2008, entitled SYSTEM AND METHOD FOR SEMI-AUTOMATIC CREATION AND MAINTENANCE OF QUERY EXPANSION RULES, by Castellani, et al.; and U.S. application Ser. No. 11/875,183, entitled REAL-TIME QUERY SUGGESTION IN A TROUBLE SHOOTING CONTEXT, filed Oct. 19, 2007, by Roulland, et al.

BACKGROUND

The exemplary embodiment relates to interactive displays. It finds particular application in connection with a multi-layer display for supporting instructional interactions between a user and a remote troubleshooter, and will be described with particular application thereto. However, it is to be appreciated that the display system finds other applications.

Users of devices like multi-function devices (MFDs), such as printers, copiers, scanners, and combinations of these often encounter problems that can be addressed by the user, with some guidance, thus avoiding the need of a service visit. In the case of a printer, these may include identifying operations on a user interface to achieve a desired printer output, fixing problems with machine hardware, such as replacing components, correcting paper jams, and solving problems with machine software. Typically, a customer can telephone a customer support center and engage in a troubleshooting session over the phone in order to try to solve the problem remotely. Part of the work of the remote troubleshooter is to guide the customer to perform a series of actions on a local user interface (LUI), which are expected to solve the problem. Miscommunication can occur if the troubleshooter does not provide logical, step-by-step instructions and ensure that each step has been performed successfully. In addition, communication is limited by the capabilities of the MFD's display, which often does not allow troubleshooters to provide an interactive and efficient way to guide customers on a LUI.

It has been found that the remote troubleshooting activity is made more complex because of the dislocation between the device and the troubleshooting resources. U.S. Pub. No. 2006/0197973 proposes a system which communicates the history and status of a device to a remote troubleshooter through a shared virtual representation of the device. However, when a user needs to perform an operation on the LUI, he may have to end a troubleshooting session in order to move to the device LUI to perform the operation, thus losing the benefits of communication with the remote troubleshooter.

The exemplary embodiment provides a display suitable for use with office equipment, such as multifunction device, which facilitates communication between a user and a remote customer support center.

INCORPORATION BY REFERENCE

The following references, the disclosures of which are incorporated by reference in their entireties, are mentioned:

The following relate generally to interfaces which provide a virtual representation of a device, such as a printer, to assist in troubleshooting a problem with the device: U.S. Pub. No. 2006/0197973, published Sep. 7, 2006, entitled BI-DIRECTIONAL REMOTE VISUALIZATION FOR SUPPORTING COLLABORATIVE MACHINE TROUBLESHOOTING, by Castellani, et al., and U.S. Pat. No. 6,744,527, issued Jun. 1, 2004, entitled USER INTERFACE FOR NAVIGATION AND CONTROL OF A PRINTING SYSTEM.

The following relate generally to interactive troubleshooting systems: U.S. Pub. No. 2008/0294423, published Nov. 27, 2008, entitled INFORMING TROUBLESHOOTING SESSIONS WITH DEVICE DATA, by Castellani, et al.; U.S. Pub. No. 2007/0192085, published Aug. 16, 2007, entitled NATURAL LANGUAGE PROCESSING FOR DEVELOPING QUERIES, by Roulland, et al., and U.S. Pub. No. 2008/0091408, published Apr. 17, 2008, entitled NAVIGATION SYSTEM FOR TEXT, by Roulland, et al.

The following relate to multi-layer screens: WO 2009/023862 to Pure Depth Ltd., and U.S. Pub. No. 2009/0070709, published Mar. 12, 2009, entitled IMPROVEMENT TO INSTRUMENTATION, to Engel.

BRIEF DESCRIPTION

In accordance with one aspect of the exemplary embodiment, a display system includes a front panel configured for selectively displaying a local user interface and being touch sensitive for controlling an associated device based on touch selectable graphic objects displayed on the local user interface. A rear panel is configured for selectively displaying the local user interface which is viewable through the front panel. A switching component is configured for switching the display of the local user interface between the front panel and the rear panel.

In accordance with another aspect of the exemplary embodiment, a method of operating a machine includes displaying a local user interface on a touch sensitive front panel of a display system. The display system is operably connected with the machine for controlling operations performed by the machine. The display system is capable of assuming an instructional mode of operation. When a request is received for the display to assume the instructional mode, the method includes switching the local user interface to a rear panel of the display system, wherein the local user interface is viewable through the front panel, and displaying instructions on the front panel.

In accordance with another aspect of the exemplary embodiment, a combination of a multifunction device and a multi-layer display system is provided. The combination includes a multifunction device including at least one marking engine. A display system is operably connected with the multifunction device for controlling operations of the multifunction device. The display system includes a touch sensitive front screen and a rear screen. The display system has a normal operating mode and an instructional operating mode. In the normal operating mode, the front screen displays a local user interface and receives user touch data for controlling the multifunction device. In the instructional mode, the rear screen displays the local user interface, which is viewable through the front screen, and the front screen displays instructions for operating the local user interface.

BRIEF DESCRIPTION OF THE DRAWINGS

FIG. 7 illustrates a troubleshooting method which may be performed using the multi-layer display system of FIG. 3.

DETAILED DESCRIPTION

Figure 1:
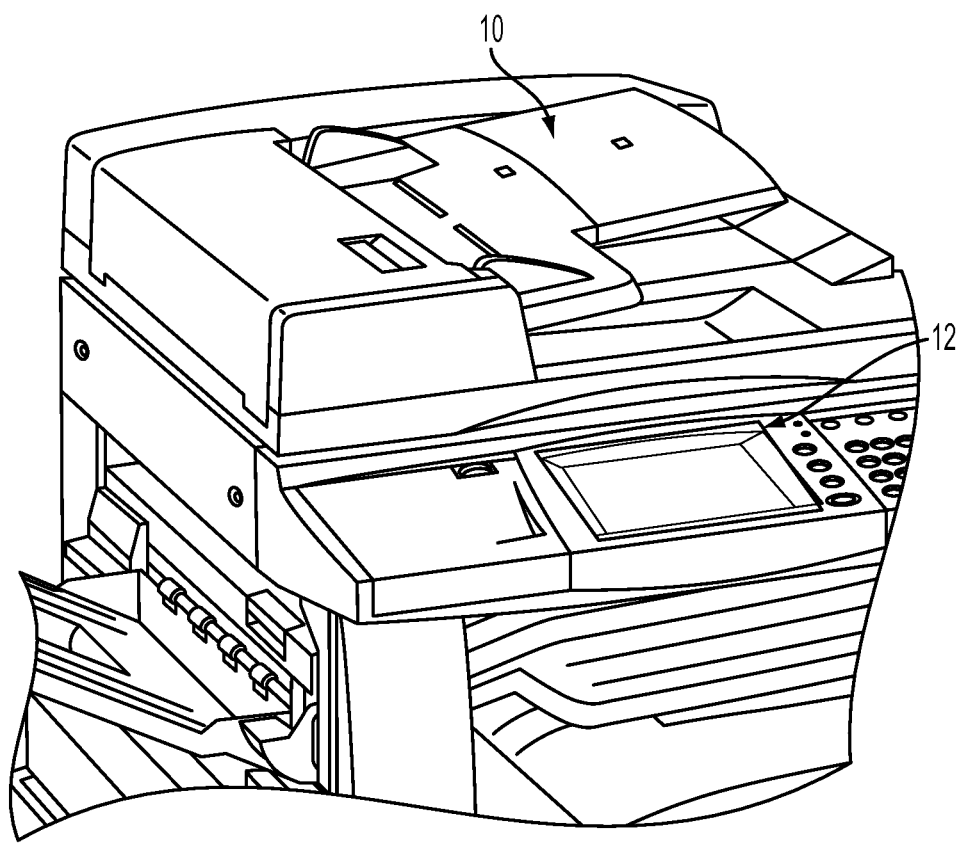
FIG. 1 is a perspective view of a multifunction device which incorporates a multi-layer display system in accordance with one aspect of the exemplary embodiment.

Aspects of the exemplary embodiment relate to a system and method for providing a Multi-Layer Display (MLD) on a device, such as a multifunction device. The MLD system is configured for showing step-by-step instructions to a user (e.g., a customer) in real time for performing an operation on the device. The exemplary system uses the device as an infrastructure to communicate screen information to a remote troubleshooter in order to improve the troubleshooting process. The exemplary embodiment finds particular application in connection with diagnostic and customer-service systems for users of office equipment, such as copiers, printers, facsimile machines, and machines offering combinations of these functions. The exemplary system guides a user to perform actions on the MLD, which would normally be performed on a local user interface, in the context of a troubleshooting session.

The MLD allows users to receive instructions and perform a series of actions on the local user interface (LUI) of a device (e.g., changing device configurations or changing LUI preferences, and the like). The embedded MLD screen on the device allows both a troubleshooting session and LUI session to run simultaneously and for the embedded (rear) screen and a LUI (front) screen to communicate (directly or indirectly) with each other in order to improve the troubleshooting process. As will be appreciated, the MLD can provide a variety of other uses, such as remote customer training and the like.

As used herein, a "user" can be any local operator of the device, who is able to observe the MLD directly, such as a customer selecting an operation which employs printing or scanning functions, or another user, such as an administrator performing administrative functions, such as printing reports of documents printed, faxed, etc. and/or diagnostic reports, or a service engineer, using an LUI, for example, to control the performance of diagnostic checks.

A "remote troubleshooter" is generally a person located remote from the device, such as in a remote customer support center, and who has to rely on a representation of the user interface rather than direct observation. In other embodiments, the troubleshooter may be a computer device which uses voice recognition software to interpret user responses to synthesized questions.

An "MFD," as used herein, encompasses any electromechanical device having a structure configured for one or more of printing, copying, faxing, scanning, and email capabilities. In general, the MFD includes at least one marking engine which applies one or more colorants, such as inks or toners, to print media, such as paper, to form an image on the print media and thereafter outputs the printed media.

The exemplary MLD is operable, at least in part, through manual actuation of a local user interface by the user. A "local user interface" or LUI refers generally to a user interface used for controlling various operations on a device, such as an MFD. The MLD may be hosted by the MFD, such as mounted to one of its panels, or may be closely located to the MFD which it controls, for example, mounted to a bracket connected to the MFD or otherwise positioned sufficiently close to the MFD that both MFD and LUI are viewable by a user operating the MFD.

Figure 2:
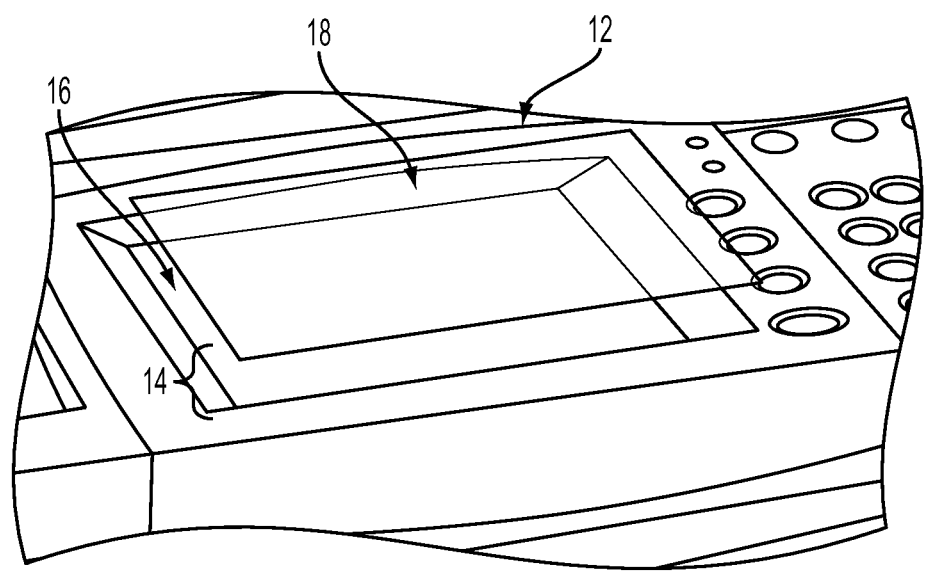
FIG. 2 is an enlarged perspective view of the display screen of the multi-layer display system of FIG. 1.
Figure 3:
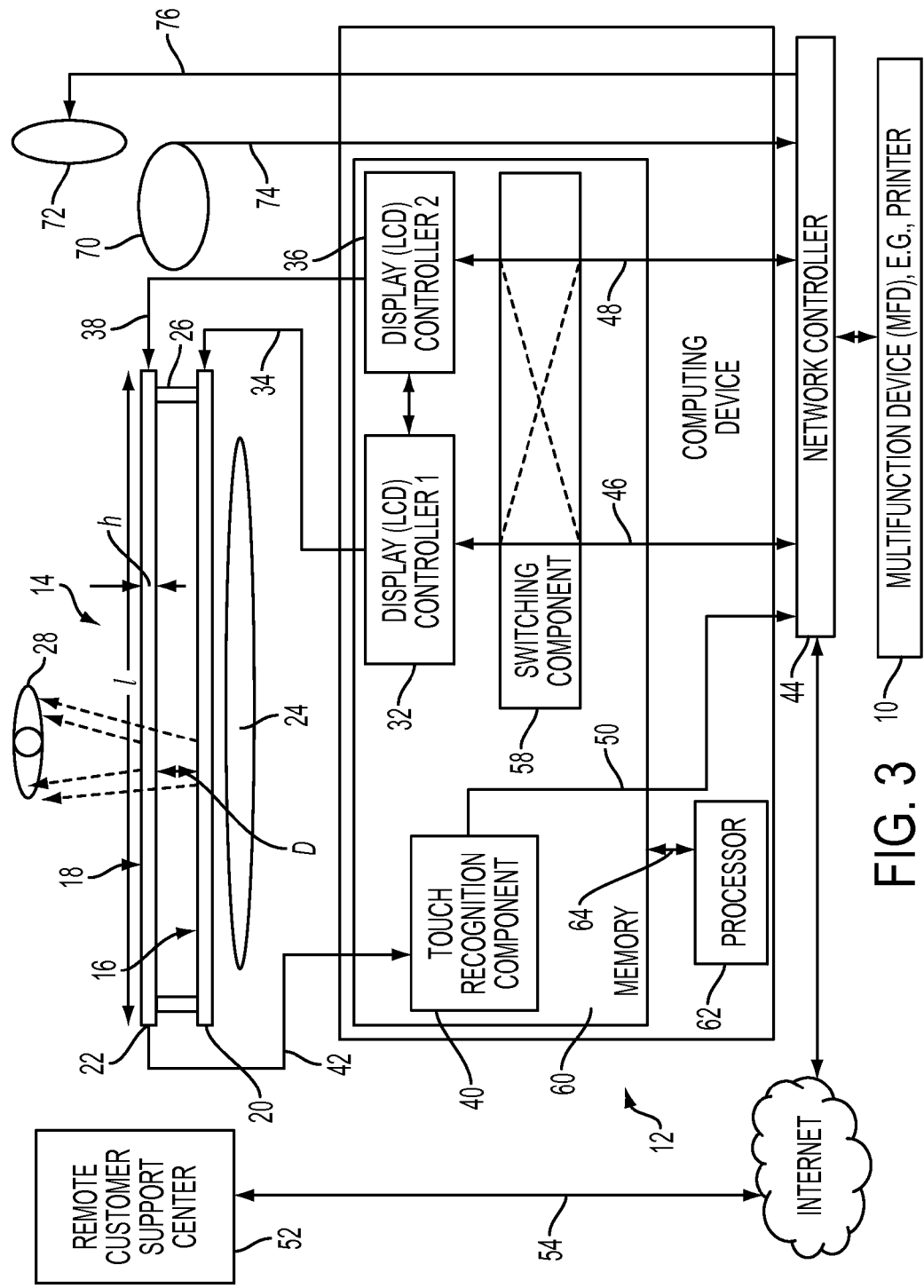
FIG. 3 is a functional block diagram of the multifunction device and display system of FIG. 1 in an operating environment.

FIG. 1 illustrates and exemplary electromechanical device in the form of a multifunction device (MFD) 10. Device 10 serves as a host for a Multi-Layer Display (MLD) system 12. As illustrated in FIG. 2, the system 12 includes a multi-layer display screen 14 which includes spaced first and second screens or layers 16, 18, each layer independently operable for displaying graphics thereon. As illustrated in FIG. 3, the screens 16, 18 are defined by a pair of stacked or overlapping first and second display panels 20, 22, which define spaced focal planes. Each panel 20, 22 may have a height h, a length l, and width w, the length and width being greater than the height and defining planar, opposed upper and lower surfaces. Each panel 20, 22 is adapted to render display elements thereon for viewing through the outermost display panel. The exemplary multi-layer display screen 14 is a liquid crystal display (LCD) screen and both panels 20, 22, are transparent LCD panels, although it is to be appreciated that one or both panels may employ other display technology, such as a plasma screen, cathode ray tube, or the like or that a single panel may provide screens 16, 18 on upper and lower surfaces thereof. The first, or rear panel 20, is spaced from and covered by the second, front panel 22. The front panel 22 is made of a material which is transparent (i.e., sufficiently transparent for light from the rear panel 20 to penetrate through the front panel 22, even though there may be some transmission loss, so that a user can see what is displayed on layer 16 of the rear panel 20). The front panel 22 is responsive to touch. By touch sensitive, it is meant that the panel 22 generates touch data responsive to a user's finger "touch," for example, through sensing pressure or local changes in an electrical property such as resistivity or capacitance changes, heat, light, or motion sensing which detects a user's finger when positioned in touching or close proximity to the panel 22. The panel 22 generates finger touch data (e.g., electrical signals) in response to such touching which allows an identification of the location of the touch on the panel 22 for controlling operation of the device based thereon. The rear panel 20 is not accessible to finger touch and need not be touch sensitive.

As shown in FIG. 3, a back light 24 may be located behind the rear panel 20 to provide illumination for the entire display 14. A mounting system 26 maintains a desired spacing d between the front and rear panels 22, 20.

In the exemplary embodiment, panels 20, 22 are lower and upper panels, respectively, arranged with their largest dimensions (length and width) in parallel horizontal planes. However the display screen 14 is not limited to two vertically stacked display panels 20, 22. For example, three or more screens could be employed. Additionally, while the exemplary multi-layer display screen 14 is shown with the panels 20, 22 in a horizontal orientation, the display screen 14 could also be oriented vertically or in any other orientation, in which case the first and second panels 20, 22 are also arranged in parallel planes, with the first panel 20 spaced from a user 28 by the second panel 22.

As shown in FIG. 3, the first panel 20 is addressable by a first LCD controller 32, via a wired or wireless link 34, which causes the panel 20 to display graphics and the like. The second panel 22 is addressable by a second LCD controller 36, via a wired or wireless link 38, which causes the panel 22 to display graphics including user selectable graphic objects, such as tabs, buttons, and the like. In some embodiments, LCD controllers 32, 36 may be combined into a single display controller. Panel 22 also communicates with a touch recognition component 40, via a link 42, which receives finger touch data from the panel 22 and identifies an actuable area of the panel corresponding to the area touched. In this way, finger touch data is communicated to LCD controller 36, which adjusts the graphics in a predetermined manner based on the area contacted (for example, by changing the operations displayed when a tab is opened). Information from the LCD controller 32, LCD controller 36, and touch recognition component 40 is communicated to a device controller 44, which may also serve as a network controller, via links such as USB links 46, 48, 50. The network controller 34 uses the information to control the operation of the device 10. The exemplary network controller 44 is also capable of communicating with a remote customer support center 52, via a wired or wireless link 54, such as the Internet, e.g., via one or more server computers (not shown).

The upper panel 22, in a normal mode of operation, may serve as the display for the device 10. It displays the LUI and receives finger touch data, which enables the user to control various operations of the device 10, such as selecting an operating mode (e.g., copying, printing, scanning, faxing etc.) and within the mode, selecting appropriate options, such as number of copies, color or monochrome, two sided or single sided, finishing options, etc., from among those available on the MFD, and optionally also obtaining data from the device 10. The display also has a second operating mode, which is referred to herein as an instructional operating mode, which, in one embodiment, is used for troubleshooting. When the multi-layer display 14 is operating in the instructional operating mode, a software switching component 58, which may be under the control of the network controller 44, switches the LUI display from the front panel 22 to the rear panel 20.

The processing components 32, 36, 40, 58 of the display system 12 may be in the form of software, hardware or a combination thereof. In one embodiment, they are software components and are stored in computer memory 60 of one or more computing device(s) 62 and executed by one or more processors 62 communicably linked by a bus 64 to the memory 60. The computing device 62 may be what is known as the digital front end of the MFD, or a separate computing device. Network controller 44 may also be a software component stored in memory, such as memory 60, and executed by processor 62 or a separate processor. While the switching component 58 is illustrated as being a separate component from the network controller, it may be part of the network controller 44. Its software instructions may be executed by the processor 62 or by a separate processor.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The memory 60 may represent any type of computer readable medium such as random access memory (RAM), read only memory (ROM), magnetic disk or tape, optical disk, flash memory, holographic memory, or combination thereof. In one embodiment, the memory 60 comprises a combination of random access memory and read only memory. In some embodiments, the processor and memory may be combined in a single chip.

For voice communication with a troubleshooter at the remote customer support center 52, a microphone 70 and speaker(s) 72 may linked to the network controller 44 by wired or wireless links 74, 76, or otherwise linked to the support center 52, e.g., via a telephone connection.

Figure 4:
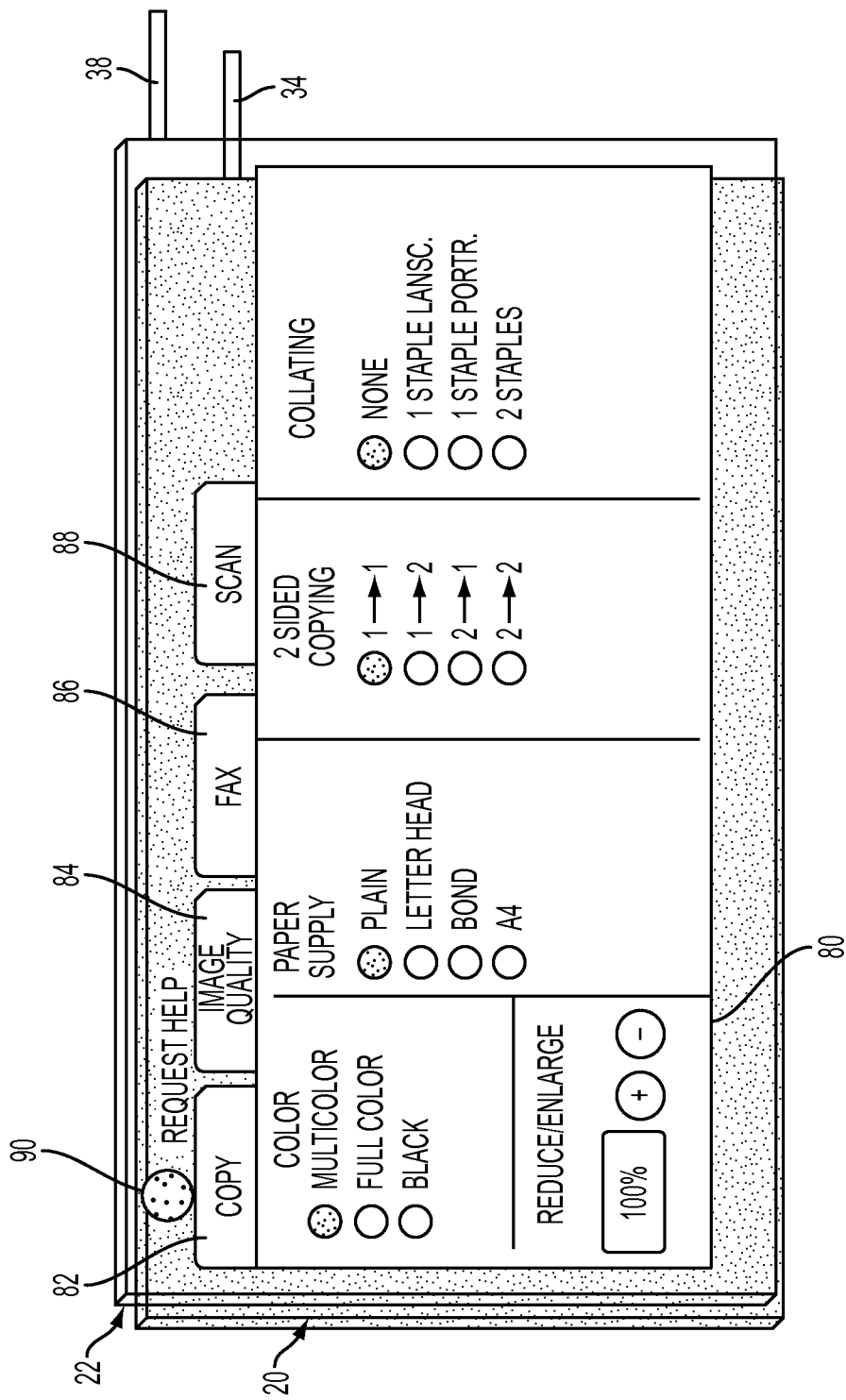
FIG. 4 is a schematic view of a top panel of the multi-layer display system during normal operation in which the local user interface is used for controlling the multifunction device.

As illustrated in FIG. 4, in the normal operation mode, the various operations of the MFD 10, which are controllable by the user, are displayed in the LUI 80 on the upper panel 22. Options, including the modes of operation, are selectable in the illustrated embodiment through opening tabs 82, 84, 86, 88 and selecting, by touching, one or more options corresponding to operations provided by the MFD, such as a color mode (e.g., black or color), a print media type, such as a selected one of various sizes and weights of paper, and a finishing mode, such as simply collating, single stapling, or double stapling, and the like. Generally, a default setting is provided for each selectable option.

Figure 5:
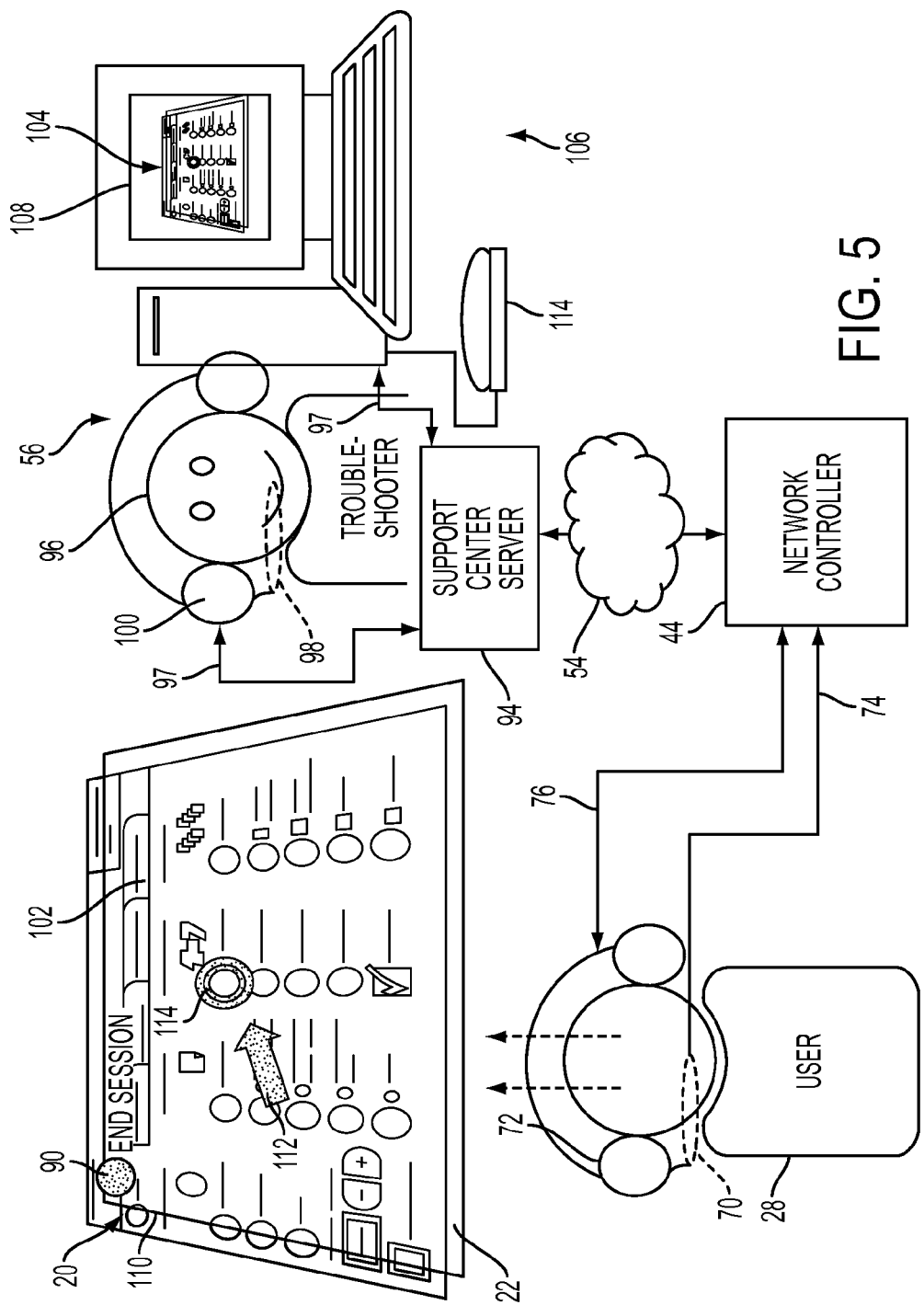
FIG. 5 is a schematic view illustrating a user and a remote call center troubleshooter sharing a visual representation of the multi-layer display screen of FIG. 2 when the display screen is operating in an instructional mode during a troubleshooting session.

A user 28 may not be familiar with all the operations provided by the MFD 10 which are controllable through the LUI 80, or be unable to locate a selectable option on the LUI which fits his or her requirements. When this occurs, the user may select a help option, e.g., by touching a "call support" button 90. The exemplary button 90 corresponds to an actuable area of front panel 22, for requesting help, and is displayed on the LUI 80 on the upper screen 18. Touching the call support button 90 causes the touch recognition component 40 to send touch data to the network controller 44, which is interpreted as a request for help. The network controller 44 initiates a trouble shooting session in which a link is made with a server computer 94 for the remote customer support center 52, allowing the user 28 to communicate with a remote troubleshooter 96, linked to the server 95 by one or more links 97 as shown in FIG. 5. Alternatively, when the machine 10 detects a problem itself, it may be indicated to the user who is advised, via the LUI 80, to call for support.

The audio-visual link 54 provides a secure audio and visual end-to-end connection to the server 94 for the customer support center 56, via a secured data connection through which relevant data is transmitted. The relevant data may include any or all of the following: machine serial number; user ID, if the user is logged in, e.g. the user's name, and any other relevant information. In the illustrated embodiment, communication between the user 28 and the remote troubleshooter 96 is by voice, e.g., by voice over internet protocol (VoIP) or a telephone connection, using respective microphones 70, 98, and speaker(s) such as a headset 72, 100 (FIG. 5). When a connection is made, the user may be instructed to put on the headphones and speaker, e.g. through a message displayed on the display 14. It is also contemplated that communication may alternatively or additionally be made by keyboard entry of text, which is displayed on a screen. However, in the context of a MFD, where space is limited, there may not be room for a full size keyboard.

In the embodiment of FIG. 5, the display screen 14 is shown in its instructional mode in which the display of the LUI 80 has been switched to the lower panel 20. The upper panel 22 is now used to display information in a troubleshooting user interface (TUI) 102. The network controller 44 communicates a visual representation of what is currently being displayed on the display 14 to the support center server 94 so that user 28 and troubleshooter 96 can share a view of the display 14 at the same time. In particular the remote troubleshooter 96 is able to view a representation 104 of the LUI 80 and TUI 102 on his own computer device 106, such as on a screen 108 of a workstation. The TUI 102 displayed on the top panel 22 is generally a modified version of the LUI 80, displaying only certain graphic objects which are of relevance to the user's problem.

When a troubleshooting session is initiated, the LUI 80 is automatically transferred to the background display panel 20 (specifically, as a visualization 110 of the LUI 80) and the panel 22 is used to show a TUI 102 for a current troubleshooting session, as shown in FIG. 5. The software switching module 58 (FIG. 3) manages the switch of the LUI 80 between the two display panels 22, 20. Thus, the upper panel 22 becomes transparent, during a troubleshooting session, except for (at least some of the time) providing a minimized LUI 102 shown for troubleshooting, for example, an indicator or a highlighted area to indicate to the user, the correct way to perform the appropriate action(s) in the right place.

During the troubleshooting session, the panel 22 is used for conveying information from the remote troubleshooter 96. For example, the TUI 102 on panel 22 may display a floating pointer 112, which is movable, over the panel 22. As will be appreciated other graphic elements may also be displayed in the TUI, such as the illustrated bounding element 114, which surrounds a button on the LUI that the troubleshooter wants the user to actuate. The graphic elements 112, 114, etc. may form a semi-transparent image through which the visualization 110 of the LUI on lower screen 16 is still visible.

Figure 6:
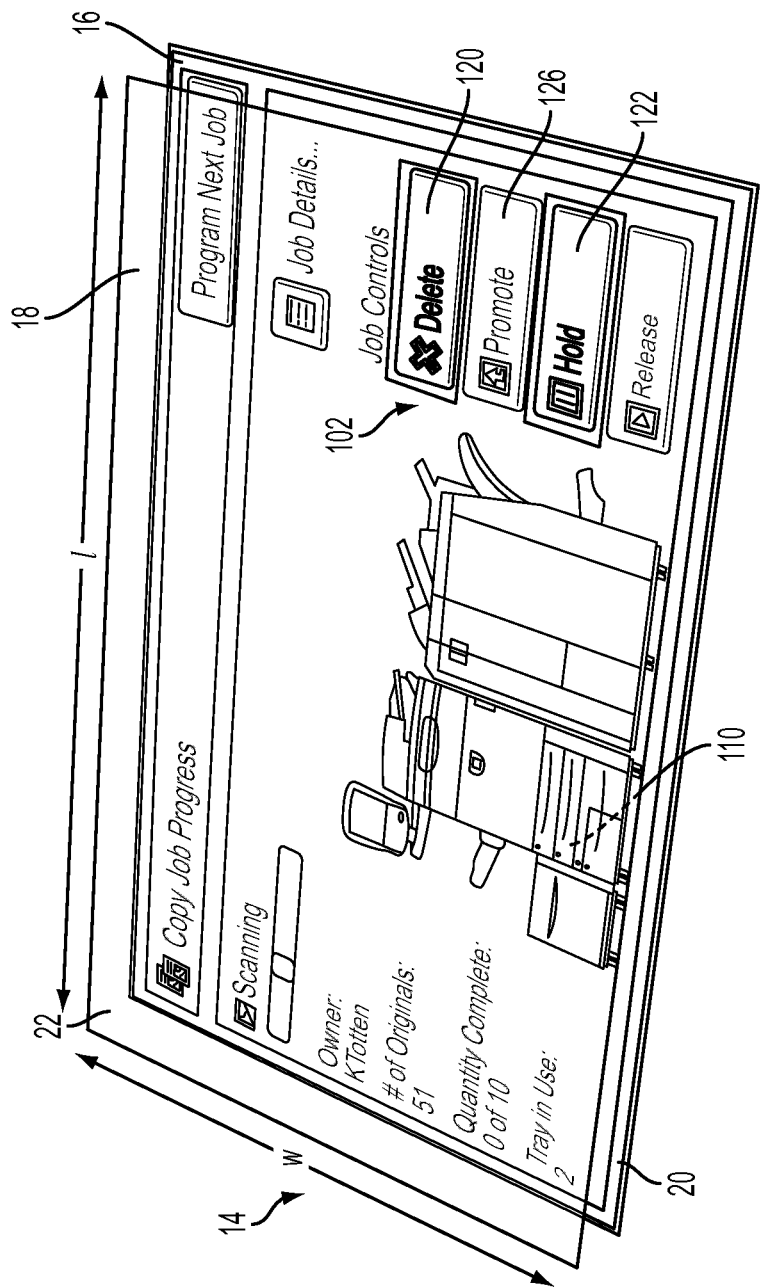
FIG. 6 is a an enlarged perspective view of the multi-layer screen in the instructional mode in which the local user interface is transferred to a rear screen and instructions in the form of graphic elements are displayed on the front screen.

Movement of the pointer 112 is controlled by the remote troubleshooter, for example, by moving a similar pointer or other graphic element over his own screen 108 using user input device(s) 114 on his workstation 106, such as a cursor control device, keypad, keyboard, touchscreen, joystick, or the like. Thus, for example, the pointer 112 may be moved to a location directly over a tab 82, 84, 86, or 88 or selectable button concurrently displayed on the lower panel 20 (but which is not actuable) while the remote troubleshooter 96 tells the user to click the tab or button. Alternatively or additionally, as shown in FIG. 6, the correct button(s) may be shown in the TUI 102 by displaying a graphic element 120, 122 visualizing the buttons to be selected on the upper screen 18, or the like, in the same location as the displayed graphic object in the visualized LUI 110 displayed on lower screen 16. The user's appropriate response is to touch the actuable area on the upper panel 22 corresponding to the graphic element 114, 120, 122, e.g., a visualized button, which has been identified by the remote troubleshooter. Thus for example, while the lower screen 16 displays a graphical representation showing all the normal user-actuable areas, such as the promote button 126 shown in FIG. 6, only the button or buttons 120, 122, which the user is instructed to touch, are visualized or otherwise highlighted on the upper screen 18.

As the buttons are pressed by the user, the LUI visualized below changes in the same way it would if it were on the top screen 22. In the exemplary embodiment, the embedded (lower) screen is controlled through the remote support center server 94. In particular, user manipulations of the top screen are conveyed via the network controller to the remote troubleshooting center and may be reviewed by the troubleshooter to see if the user has performed the right action. If so, the troubleshooter validates the action and the remote troubleshooting center sends a confirmation to the network controller. The network controller receives the confirmation from the remote troubleshooting center and causes the lower screen to change, simulating a response to the user's touch of the upper screen. In other embodiments, the upper screen may communicate directly with the lower screen, or via the network controller.

During a troubleshooting session, the customer 28 may click on a wrong button if he misunderstands the explanation from the troubleshooter 96. If the user presses an incorrect actuable area (such as the region corresponding to the "PROMOTE" button 126, this information is transmitted to the remote troubleshooter, who may use voice and/or pointer 112, on TUI 102 to indicate the user's mistake. By using a multi-layer touch screen 14, LUI 80 is shown under the top layer 18 and cannot handle finger touch data directly. In the case of an incorrect user touch, the troubleshooter can temporarily limit the data transfer from the top layer 18 in order to prevent the customer from clicking on the wrong button. In this way, the connection to the machine 10 may be disabled, preventing the MFD 10 from responding to the incorrect user action.

For example, as shown in FIG. 6, touching the position where the buttons "DELETE" and "HOLD" located is allowed. However, if the customer clicks on the button "PROMOTE", the top panel 22 will not transfer this finger touch data to the LUI 80 so that a click event will not be triggered. Additionally, if the customer clicks on a wrong button or a wrong area, the troubleshooter can receive feedback to let him know that the customer has performed an incorrect action on the touch screen 22. Therefore, the troubleshooter can change the way in which he explains the actions to be performed. In this way, the communication between customer and troubleshooter can be improved.

FIG. 7 illustrates a troubleshooting method for an exemplary troubleshooting session. The session starts at S100, when a troubleshooting session is initiated, generally by the user (e.g., by pressing button 90), but in some instances by the device 10. For example if the network controller 44 detects a new user or that a user has taken more than a predetermined length of time for making a selection on the LUI 80, a troubleshooting session is initiated by the network controller 44.

At S102, the LUI 80 is transferred from the top layer 18 (panel 22) to the bottom layer 16 (panel 20) by the switching component 58 in response to an instruction from the network controller 44. The top panel 22 continues to be responsive to finger touch data.

At S104, screen information concerning the LUI 80 displayed is sent to the customer support center 52. Fault tolerant control data is also sent from the upper screen 18 to the customer support center 52. For example, if a customer clicks on a wrong button on the upper screen, the network controller notifies the remote troubleshooting center of this action by sending a fault code or screen information. The customer may be provided with visual feedback on the error by display of information on the top screen.

At S106, a visualization 104 of the user's display screen 14 is displayed to the remote trouble shooter, e.g., on the troubleshooter's display 108, based on the received data.

At S108, the troubleshooter provides an instruction based on the user's screen information, e.g., verbal instructions and/or graphic instructions.

At S110, the instruction is sent to the user via link 54 and at S112, is visualized on the top layer 18 of the display. For example, one or more instructional graphic objects 112, 114, 120, 122 may be displayed on TUI 102 (modified LUI).

Finger touch data from the user in response to the instructions is obtained from the top panel 22 at S114. As the buttons are pressed, the LUI visualized on the rear screen 20 changes in the same way it would if it were on the top screen 22.

The cycle may be repeated one or more times before the troubleshooting session is terminated at S116 (e.g., by the troubleshooter or by an automatic timeout or by the user pressing button 90).

At S118, the LUI 80 is returned to the upper screen 18.

The method ends at S120.

As will be appreciated, the steps of the method need not all proceed in the order illustrated and fewer, more, or different steps may be performed.

The method illustrated in FIG. 7 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 7, can be used to implement the method.

The exemplary two-layer display system 12 and method of use provide advantages over existing systems. Because the layers 16, 18 define closely spaced focal planes, a user is able to rapidly change focus from one screen to the other screen, without requiring head movement. Additionally, superimposing an instruction graphic over a visualization 110 of the LUI 80 makes it immediately apparent which buttons must be pressed. As the buttons are pressed, the LUI visualized below changes in the same way it would if it were on the top screen 22. The superposition of graphical images in this way is not distracting to the user, who is able to assimilate layered information. When viewing layered information, the user's attention can be focused on a selected layer without distraction from another. This allows information to be searched for, accessed, and read more quickly when it is split across two levels of depth as opposed to having it all displayed on a single plane or on side by side screens.

In existing single-layer systems, a dialog box is often displayed to highlight an area for drawing the user's attention. However, the displaying of the dialog box prevents visualization of the information below it. While side by side panels or split screens could be used (space permitting) to show both the LUI and the dialog box, this may bring its own problems. A user would need to repeatedly change his viewing angle, and, in so doing, may forget what is being shown on the other screen. In conventional systems, where a user may have to walk between the LUI on the MFD and a screen on his workstation which is being used for the troubleshooting session, the situation is even worse, since the user may forget what he has seen or been instructed to do during each relocation. Additionally, the troubleshooting session may automatically time out if he takes too long in responding.

The exemplary MLD panels 20, 22 overcome this problem by maintaining a constant, clear full-sized image of the primary image being displayed whilst floating a semi-transparent image above, when needed. The user can be immediately aware of the new information being displayed, and can continue to view details of the original images and information on the LUI beneath. The user is not required to lose eye contact with the primary image whilst responding to the detail being displayed or providing data input required.

The exemplary MLD 14 is easier to read than a single layer device (SLD), is easier to understand than a SLD or a separate screen device SSD, is easier to maintain communications than on a SLD, tolerates faults more readily, by providing the user with feedback on his mistakes, and does not tax the thinking capabilities of the user as much as an SLD or SSD. Additionally, its footprint on an MFD 10 is smaller than for a SSD, if both screens of the SSD were to be accommodated on the MFD.

Because the MLD system 12 is easier to use than existing troubleshooting systems, it may reduce the time taken in a troubleshooting session, reducing the number of troubleshooters needed to staff the remote customer support center.

While in the exemplary embodiment, the MLD system 12 is described for use in a troubleshooting session with a remote troubleshooter, its use is not limited to such applications. As noted above, the display system 12 may have two modes, an instructional mode (e.g., for troubleshooting) in which the LUI is switched to the lower panel, and a normal operating mode for normal operation, where the LUI is switched to the upper panel. In one embodiment, help is provided through a "help" software component, which may be stored in memory 60 and executed by processor 62 or accessed remotely, e.g., via the Internet. In this embodiment, the user is guided by the software component in a similar manner to interactions with a remote troubleshooter, but in this case, the software generates the TUI and provides text or voice synthesized instructions. Another use of the MLD system 12 in its instructional mode is in customer training. The user may view a training program on the display 14 in which comments are displayed on the upper panel 22 while the components are being displayed beneath. The training program may be generated by a training application stored as software in associated memory which may be located in the device 10 or remotely accessed, e.g., via the internet. When the component is the LUI 80, the user may be given the opportunity to visualize or practice various operations by having the appropriate buttons highlighted on the upper panel 22.

The MLD system 12 may also be used in a troubleshooting session for displaying operations to be performed by the user on components of the MFD, other than the LUI 80. For example, the lower panel 20 may be used to display a representation of a part of the machine 10. When the user actuates an area of the upper panel 22, information about the component displayed beneath may be provided on the upper panel. Similarly, instructions from a troubleshooter or an automated troubleshooting system may be displayed on the upper panel 22, without preventing the component from being viewed on the lower panel at the same time.

Another use of the MLD system 12 is to display additional information during normal operation. For example, during normal operation of the device 10, one of the panels 20 may be used to display information useful to the user, while the other panel 22 displays the LUI 80. As an example, the panel 20 may display a page in the process of being scanned, allowing the user to detect when scanning is complete and also to verify that the document being scanned has been correctly positioned on the scanning window.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A display system comprising:
   a transparent front panel configured for selectively displaying a local user interface and being touch sensitive for controlling an associated device based on touch selected graphic objects displayed on the local user interface;
   a rear panel, configured for selectively displaying the local user interface, which is viewable through the front panel;
   wherein the front and rear panels are arranged in first and second spaced parallel planes, respectively;
   a switching component configured for switching the display of the local user interface between the front panel and the rear panel, wherein the switching component switches the display of the local user interface from the front panel to the rear panel when the display system is in an instructional mode and returns the display of the local user interface from the rear panel to the front panel when a normal operation mode of the display system is resumed;
   wherein the instructional mode includes a troubleshooting mode for troubleshooting a problem with the associated device in which the front panel displays a graphic element indicating one of the graphic objects of the local user interface displayed on the rear panel, the graphic objects representing a function of the local user interface for the user to select in order to control the associated device, and the local user interface being controllable from the touch sensitive front panel; and
   memory in communication with the display system, the memory storing instructions for:
   (i) receiving a request to initiate the troubleshooting mode;
   (ii) switching the local user interface to the rear panel, wherein the local user interface is viewable through the front panel;
   (iii) sending at least one of screen information and fault code information to a remote support center, wherein the screen information includes a visualization of the front and rear panel;
   (iv) receiving an instruction from the remote support center based on the at least one of screen information and fault code information; and
   (v) displaying the instruction from the remote support center on the front panel, wherein the instruction includes an instructional graphic element which provides information about a graphic object displayed in the local user interface on the rear panel.

2. The display system of claim 1, wherein the graphic element comprises at least one of a pointer, a bounding box, and a representation of the graphic object.

3. The display system of claim 1, wherein the graphic element is superimposed on the graphic object, the local user interface displayed in the rear panel being operable by touching the graphic element displayed on the front panel.

4. The display system of claim 1, wherein the instructional mode includes a training mode in which the graphic element is displayed in response to an automatic instruction generated by a training application stored in the memory.

5. The display system of claim 1, further comprising a first display controller which controls a display on the rear panel and a second display controller which controls a display on the front panel, the first and second display controllers being in communication with the switching component.

6. The display system of claim 1, wherein at least one of the front and rear panels comprises an LCD screen.

7. The display system of claim 1, wherein the rear panel is incapable of receiving finger touch data.

8. The display system of claim 1, wherein the front panel further comprises a touch actuable area which, when actuated, initiates the instructional mode in which the switching component switches the displayed local user interface from the front panel to the rear panel.

9. A multifunction device comprising the display system of claim 1 and a marking engine which applies one or more colorants to print media, the marking engine being operably connected with the local user interface when the local user interface is displayed on the front panel.

10. The multifunction device of claim 9, further comprising a network connection capable of linking the display system to a remote support center.

11. A method of instructing a user comprising:
    providing the display system of claim 1;
    initiating a connection between the display device and a remote support center;
    switching the local user interface to the rear panel; and
    displaying information from the remote support center on the front panel.

12. A non-transitory computer program product encoding instructions, which when executed on a computer causes the computer to perform the method of claim 11.

13. In combination, a multifunction device and a multi-layer display system comprising:
    a multifunction device including at least one marking engine which applies one or more colorants to print media; and
    the display system of claim 1.

14. The system of claim 13, wherein the front panel is transparent.

15. The system of claim 13, wherein the front and rear panels are arranged in first and second spaced parallel planes, respectively.

16. The system of claim 13, wherein in the instructional mode, the front screen displays instructions for operating the local user interface by displaying a graphic element which provides information about a graphic object displayed in the local user interface on the rear panel beneath the graphic element.

17. The combination of claim 13, wherein the multifunction device includes at least one scanner.

18. The display system of claim 1, wherein the associated device is at least one of a printer, copier, and scanner.

19. The system of claim 1, wherein displaying the instruction from the remote support center further includes superimposing the instructional graphic element over the graphic object to indicate a correct actuable area of the front panel.

20. The system of claim 1, wherein the local user interface displayed on the rear panel changes in response to the touch data received from the correct actuable area of the front panel.

21. The system of claim 1, further including sending at least one of screen information and fault code information to the remote support center when touch data is received from an area other than the correct actuable area.

22. The system of claim 1, wherein the associated device is a multifunction device and the display system is operably connected with the multifunction device for controlling operations of the multifunction device.

23. A method for troubleshooting a problem with a machine, comprising:
displaying a local user interface on a touch sensitive front panel of a display system operably connected with the machine for controlling operations performed by the machine, the display system being capable of assuming an instructional mode of operation including a troubleshooting mode for troubleshooting a problem with the machine;
when a request is received for the display to assume the troubleshooting mode, switching the local user interface to a rear panel of the display system, wherein the local user interface is viewable through the front panel and both the local user interface and troubleshooting mode run simultaneously;
sending at least one of screen information and fault code information to a remote support center, wherein the screen information includes a visualization of the front and rear panel;
receiving an instruction from the remote support center based on the at least one of screen information and fault code information; and
displaying the instruction from the remote support center on the front panel, wherein the instruction includes an instructional graphic element providing information for operating with a graphic object displayed in the local user interface on the rear panel beneath the graphic element, the local user interface being controlled by the graphic object, wherein the graphic object is actuated through the graphic element displayed on the touch sensitive front panel.

24. The method of claim 23, wherein when the front panel generates touch data representative of a user attempting to actuate a graphic object other than one indicated by the graphic element, dynamically providing instructions to the user in response to the touch data indicating the error and optionally disabling connection between the local user interface and the machine.

25. A non-transitory computer program product encoding instructions, which when executed on a computer causes the computer to perform the method of claim 23.

26. The method of claim 23, wherein the machine is at least one of a printer, copier, and scanner.

* * * * *